United States Patent
Mizukami (10) Patent No.: US 9,388,830 B2
(45) Date of Patent: Jul. 12, 2016

(54) ACCUMULATOR

(71) Applicant: NHK SPRING CO., LTD., Yokohama-shi, Kanagawa (JP)

(72) Inventor: Hiroshi Mizukami, Kanagawa (JP)

(73) Assignee: NHK SPRING CO., LTD., Yokohama-Shi (JP)

( * ) Notice: Subject to any disclaimer, the term of this patent is extended or adjusted under 35 U.S.C. 154(b) by 0 days.

(21) Appl. No.: 14/627,230

(22) Filed: Feb. 20, 2015

(65) Prior Publication Data

US 2015/0240839 A1 Aug. 27, 2015

(30) Foreign Application Priority Data

Feb. 24, 2014 (JP) ................................ 2014-032916

(51) Int. Cl.
| | |
|---|---|
| *F16L 55/04* | (2006.01) |
| *F15B 1/10* | (2006.01) |
| *F16L 55/053* | (2006.01) |
| *B60T 17/06* | (2006.01) |
| *F15B 1/08* | (2006.01) |

(52) U.S. Cl.
CPC ................ *F15B 1/103* (2013.01); *B60T 17/06* (2013.01); *F15B 1/083* (2013.01); *F16L 55/053* (2013.01)

(58) Field of Classification Search
USPC ....................................................... 138/30, 31
See application file for complete search history.

(56) References Cited

U.S. PATENT DOCUMENTS

| | | | | | |
|---|---|---|---|---|---|
| 2,390,320 | A | * | 12/1945 | Overbeke ................ | F15B 1/18 138/30 |
| 2,604,118 | A | * | 7/1952 | Greer ....................... | F15B 1/20 138/30 |
| 3,040,835 | A | * | 6/1962 | Ahnert .................... | F16N 7/34 138/31 |
| 4,102,465 | A | * | 7/1978 | Zahid ....................... | F15B 1/22 138/30 |

(Continued)

FOREIGN PATENT DOCUMENTS

| | | |
|---|---|---|
| JP | 2003-172301 | 6/2003 |
| JP | 2004-232784 | 8/2004 |
| JP | 2006-010005 | 1/2006 |

(Continued)

OTHER PUBLICATIONS

European Search Report dated Jul. 20, 2015.

(Continued)

*Primary Examiner* — James Hook
(74) *Attorney, Agent, or Firm* — Rankin, Hill & Clark LLP (57) ABSTRACT

An accumulator includes a bellows housed to freely expand and contract in a shell, a port part having a pressure fluid inflow port formed therein, and a self-sealing member arranged on a tip portion of the bellows to face the port part, in which when a pressure in the fluid chamber is lower than a predetermined pressure relative to an air chamber, the self-sealing member is allowed to abut onto a seal area of the port part to block the pressure fluid inflow port. The self-sealing member includes a resilient member arranged on a surface of a base material part, and an overhanging portion formed on the resilient member and allowed to abut onto the seal area for sealing. The port part includes a seal face having the seal area formed thereon, and a projecting portion arranged on a region other than the seal area on the seal face.

7 Claims, 10 Drawing Sheets

(56) References Cited

U.S. PATENT DOCUMENTS

| | | | | |
|---|---|---|---|---|
| 6,286,552 | B1* | 9/2001 | Shimbori | B23K 11/002 138/30 |
| 7,628,175 | B2* | 12/2009 | Miyake | F15B 1/103 138/26 |
| 8,875,740 | B2* | 11/2014 | Baltes | F15B 1/103 138/26 |
| 2004/0055656 | A1* | 3/2004 | Kurokawa | B60T 13/148 138/30 |
| 2005/0034953 | A1* | 2/2005 | Carne | F16D 25/14 192/85.63 |

FOREIGN PATENT DOCUMENTS

| | | |
|---|---|---|
| JP | 2009-236137 | 10/2009 |
| JP | 2009-250261 | 10/2009 |
| JP | 2012-137140 | 7/2012 |
| WO | 2009/047964 A1 | 4/2009 |
| WO | 2013/187165 A1 | 12/2013 |

OTHER PUBLICATIONS

Japanese Notice of Reasons for Rejection, Mailing Date: Dec. 2, 2014, English translation included.

* cited by examiner

ACCUMULATOR

CROSS-REFERENCE TO RELATED APPLICATION

This application is based upon and claims the benefit of priority to the Japanese Patent Application No. 2014-032916, filed on Feb. 24, 2014, the entire contents of which are incorporated herein by reference.

BACKGROUND OF THE INVENTION

1. Field of the Invention

The present invention relates to an accumulator, more particularly, to an accumulator that is adapted, in a non-normal operation in which a pressure and a temperature in an air chamber increase more excessively than in a normal operation, to release the pressure in the air chamber through a gap portion formed between a self-sealing member and a seal face facing the self-sealing member.

2. Description of the Related Art

A fluid-pressure circuit such as a braking circuit used in an automobile employs an accumulator that temporarily accumulates pressurized fluid. Formed in the accumulator are an air chamber adapted to allow high-pressure gas to be filled therein, and a fluid chamber adapted to allow pressure fluid (hydraulic oil) from the fluid-pressure circuit to be introduced thereinto. The air chamber and the fluid chamber are arranged to face each other across an elastic bellows, and the bellows is allowed to expand and contract, thereby balancing the pressure in the air chamber with the pressure in the fluid chamber to suppress pulsation in the fluid-pressure circuit to regulate its fluid pressure to an appropriate value.

Such an accumulator has heretofore had a possibility that an internal pressure of the air chamber of the accumulator excessively increases, for example, when the automobile encounters a fire or the like to be placed in a high-temperature environment for a long time. To cope with this, the accumulator is provided with a relief means for emergency evacuation that releases the internal pressure of the air chamber when it encounters such an abnormal state (for example, Patent Document 1: Japanese Patent Application Publication No. 2003-172301, and Patent Document 2: Japanese Patent Application Publication No. 2006-010005).

Patent Document 1 describes an accumulator (see paragraph [0017] and FIG. 1) in which, as a relief means that releases the internal pressure of the air chamber, the fragile portion 11 is formed with a reduced thickness at a portion of the side wall of the stay 4 arranged in the fluid chamber 8. This accumulator is adapted, when the internal pressure of the air chamber excessively increases, to allow the bellows to be compressed with the excessively increased internal pressure of the air chamber to increase the internal pressure of the fluid chamber 8, thereby breaking the fragile portion 11.

Moreover, the accumulator is adapted, with the fragile portion 11 being broken, to discharge high-pressure pressure fluid from the fluid chamber 8 to decrease the pressure in the fluid chamber 8, thereby damaging the bellows purposefully with the excessively increased internal pressure of the air chamber to release the internal pressure of the air chamber.

Patent Document 2 describes an accumulator (see paragraph [0027], FIG. 3 and FIG. 4) in which, as a relief means that releases the internal pressure of the air chamber, the groove 62 is formed on the surface (first portion 61) of the base material 56 of the self-sealing member 55 which is allowed to abut onto the dividing wall 35 forming the seal face. This accumulator is adapted to discharge the fluid Q in the fluid chamber 50 through the groove 62 to the outside of the shell 11 to decrease the pressure in the fluid chamber 50, thereby damaging the bellows purposefully with the pressure difference between the air chamber and the fluid chamber to release the pressure in the air chamber 51.

However, the accumulator described in Patent Document 1 has posed problems in that machining of the fragile portion 11 is complicated and thus accuracy control for the machining is required to increase a machining man-hour and to decrease production efficiency.

Moreover, the accumulator described in Patent Document 2 has posed problems in that, since the groove 62 is formed on the surface (first portion 61) of the base material 56 of the self-sealing member 55, every time the resilient member 57 arranged to cover the surface of the base material 56 abuts onto the seal face 35a of the dividing wall 35, the resilient member 57 is gradually damaged to affect sealing performance and/or duration of life.

SUMMARY OF THE INVENTION

The present invention has been made in view of the background described above and an object thereof is to provide an accumulator which can reduce a machining man-hour with a simple configuration; prevent damage of a self-sealing member and improve durability thereof to realize a stable and reliable operation of the accumulator in a normal operation; and release an internal pressure of an air chamber quickly and reliably in a non-normal operation in which a temperature rises more excessively than in the normal operation.

In order to solve the above problems, the present invention provides an accumulator that includes: a shell inside which an air chamber and a fluid chamber are formed; a bellows which is housed to freely expand and contract in the shell and partitions the inside of the shell into the air chamber and the fluid chamber; a port part which is provided on the shell and in which a pressure fluid inflow port that is open to the fluid chamber is formed; and a self-sealing member which is arranged on a tip portion of the bellows to face the port part, wherein when a pressure in the fluid chamber is lower than a predetermined pressure relative to a pressure in the air chamber, the self-sealing member is allowed to abut onto a seal area of the port part to block the pressure fluid inflow port, and wherein the self-sealing member includes a base material part, a resilient member which is arranged on a surface of the base material part to face the seal area, and an overhanging portion which is formed on the resilient member and allowed to abut onto the seal area for sealing, and the port part includes a seal face which is allowed to abut onto the overhanging portion and on which the seal area is formed, and a projecting portion which is arranged on a region other than the seal area on the seal face, and wherein when a temperature in the air chamber rises more excessively than in a normal operation, the overhanging portion on the resilient member transubstantiates to allow the projecting portion to abut onto the base material part and to form between the seal face and the self-sealing member a gap portion which leads from an outer border of the seal face to the pressure fluid inflow port, so as to release the pressure in the air chamber through the gap portion.

The accumulator according to the present invention is adapted, in the normal operation, to balance the pressure in the fluid chamber with the pressure in the air chamber to regulate a fluid pressure of a fluid-pressure circuit and when the pressure in the fluid chamber is lower than the predetermined pressure, to allow the overhanging portion of the self-sealing member to abut onto the seal area of the port part to block the pressure fluid inflow port, so as not to decrease the fluid pressure of the fluid-pressure circuit too much below a specified value.

Moreover, since the projecting portion formed in the port part is arranged on the region other than the seal area to prevent the projecting portion and the resilient member of the self-sealing member from interfering with each other, the resilient member can be prevented from being damaged to secure a stable sealing performance and improve durability thereof.

On the other hand, the accumulator according to the present invention is adapted, besides the case where the pressure in the fluid chamber is lower than the predetermined pressure, even when the temperature in the air chamber rises excessively due to a fire or the like to cause the pressure in the air chamber to increase more excessively than a predetermined pressure in the normal operation (in a non-normal operation), to allow the overhanging portion of the self-sealing member to abut onto the seal area of the port part to block the pressure fluid inflow port. In such a non-normal operation, the resilient member is subjected to high heat to melt and/or carbonize to cause the overhanging portion on the resilient member to lose its sealing performance, thereby allowing the projecting portion arranged in the port part to abut onto the base material part.

Since the accumulator according to the present invention is adapted, in the non-normal operation, to form between the seal face and the self-sealing member the gap portion which leads from the outer border of the seal face to the pressure fluid inflow port, the pressure in the air chamber can be released through the gap portion quickly and reliably.

More specifically, in the non-normal operation, the pressure fluid in the fluid chamber is discharged through the gap portion leading to the pressure fluid inflow port to cause the pressure in the fluid chamber to decrease, thereby increasing the pressure in the air chamber (gas pressure) which acts on a peripheral wall (e.g., inner peripheral wall) of the bellows from one side of the bellows serving as a partition, more excessively than the pressure of the pressure fluid (fluid pressure) which acts on a peripheral wall (e.g., outer peripheral wall) of the bellows from the other side of the bellows. Consequently, the gas pressure acts on the bellows which has partitioned the inside of the shell into the fluid chamber and the air chamber, thereby making it possible to damage the bellows purposefully to allow high-pressure gas in the air chamber to pass through the fluid chamber and release it from the pressure fluid inflow port.

In this manner, in the non-normal operation in which the temperature in the air chamber rises more excessively than in the normal operation, the bellows is damaged quickly and reliably to cause airtightness of the fluid chamber to be lost to allow the high-pressure gas to flow from the air chamber into the fluid chamber. Consequently, the high-pressure gas in the air chamber passes through the bellows, then passes through the gap portion leading from the outer border of the port part to the pressure fluid inflow port, and is discharged quickly through the pressure fluid inflow port, thereby decreasing a pressure of the gas in the air chamber.

Thus, the accumulator of the present invention makes it possible to reduce a machining man-hour with a simple configuration that the projecting portion is provided on the port part; to reliably prevent damage of the resilient member and improve durability thereof to realize a stable and reliable operation of the accumulator in the normal operation; and to release the high-pressure gas in the air chamber quickly and reliably with the projecting portion abutting onto the base material part in the non-normal operation in which the temperature rises more excessively than in the normal operation.

The accumulator described above may be configured such that the seal area is formed circularly around the pressure fluid inflow port, and the projecting portion is arranged on at least one of an outer side and an inner side in a radial direction of the seal area relative to the pressure fluid inflow port.

The accumulator according to the present invention is adapted to arrange the projecting portion on at least one of the outer side and the inner side in the radial direction of the seal area relative to the pressure fluid inflow port, thereby making it possible, when the projecting portion is allowed to abut onto the base material part in the non-normal operation, to stably support the base material part at the outer border side or the inner border side of the seal face to secure the gap portion which leads from the outer border of the seal face to the pressure fluid inflow port. Consequently, the pressure fluid in the fluid chamber is discharged through the gap portion, thereby making it possible to damage the bellows purposefully to allow the high-pressure gas in the air chamber to be discharged through the pressure fluid inflow port.

Moreover, when the projecting portion is arranged on both of the outer border side and the inner border side of the seal face, the base material part can be supported at both of the outer border side and the inner border side to prevent flexure of the base material part effectively to secure the gap portion more reliably.

The accumulator described above may be configured such that the projecting portion is arranged in a discontinuous circular pattern with a spaced portion provided in a circumferential direction around the pressure fluid inflow port.

The accumulator according to the present invention is adapted to provide the spaced portion in the circumferential direction, thereby making it possible to form the gap portion reliably while reducing the machining man-hour with the simple configuration.

The accumulator described above may be configured such that the projecting portion is arranged on the outer side of the seal area in the radial direction relative to the pressure fluid inflow port, and the port part is provided with a discharge channel which is formed at an opening edge portion of the pressure fluid inflow port on the seal face to extend outwardly in a radial direction.

The accumulator according to the present invention is adapted to have the discharge channel which is formed at the opening edge portion of the pressure fluid inflow port on the seal face to extend outwardly in the radial direction, thereby making it possible, even if a height of the gap portion near the pressure fluid inflow port is reduced due to flexure of the base material part, to more reliably discharge the pressure fluid and the like introduced into the gap portion, through the discharge channel and the pressure fluid inflow port.

The accumulator described above may be configured such that the port part is provided with a port member configured as a separate unit for the shell and the port member is fixed to the shell.

Since the accumulator according to the present invention is adapted to provide the port part as a separate unit for the shell to enable rigidities of the port part and the shell to be improved, a reliable and stable operation can be ensured even in the non-normal operation.

The accumulator described above may be configured such that the port part is arranged on one end face portion of the shell, and a base end portion of the bellows which is on an opposite side of the tip portion thereof is supported on another end face portion of the shell.

Since the accumulator according to the present invention is adapted to arrange the port part on one end face portion of the shell and to support the base end portion of the bellows on another end face portion of the shell to thereby enable a cross-sectional area on the fluid chamber side to be enlarged because the bellows is arranged on the air chamber side, an area of an end face of the flange portion can be enlarged to improve the sealing performance on the seal face.

The accumulator according to the present invention makes it possible to reduce a machining man-hour with a simple configuration; to prevent damage of the self-sealing member and improve durability thereof to realize a stable and reliable operation of the accumulator in the normal operation; and to release an internal pressure of the air chamber quickly and reliably in the non-normal operation in which the temperature rises more excessively than in the normal operation.

BRIEF DESCRIPTION OF THE DRAWINGS

FIGS. 2A and 2B are cross-sectional views showing a motion in normal operation of the accumulator according to the embodiment of the present invention, in which FIG. 2A shows a state in which a pressure fluid inflow port is blocked due to a decrease in a fluid pressure of a fluid-pressure circuit.

FIGS. 7A and 7B are partial cross-sectional views showing motions in a non-normal operation of the accumulator according to the embodiment of the present invention, in which FIG. 7A shows a state in which a gas pressure in the air chamber increases to cause a pressure fluid inflow port to be blocked.

FIGS. 8A and 8B are views showing a flow of pressure fluid through a gap portion in the non-normal operation of the accumulator according to the embodiment of the present invention, in which FIG. 8A is a perspective view of the port part.

FIGS. 9A and 9B are views showing a state in which a high-pressure gas in the air chamber is released in the non-normal operation of the accumulator according to the embodiment of the present invention, in which FIG. 9A is a partial cross-sectional view showing the condition.

FIGS. 10A and 10B are perspective views showing modified examples of a projecting portion in the accumulator according to the embodiment of the present invention, in which FIG. 10A is a modified example in which projecting portions are provided inside a seal area.

EMBODIMENT OF THE INVENTION

A configuration of an accumulator 1 according to an embodiment of the present invention will be described in detail with reference to FIGS. 1 to 3 as appropriate.

Figure 1:
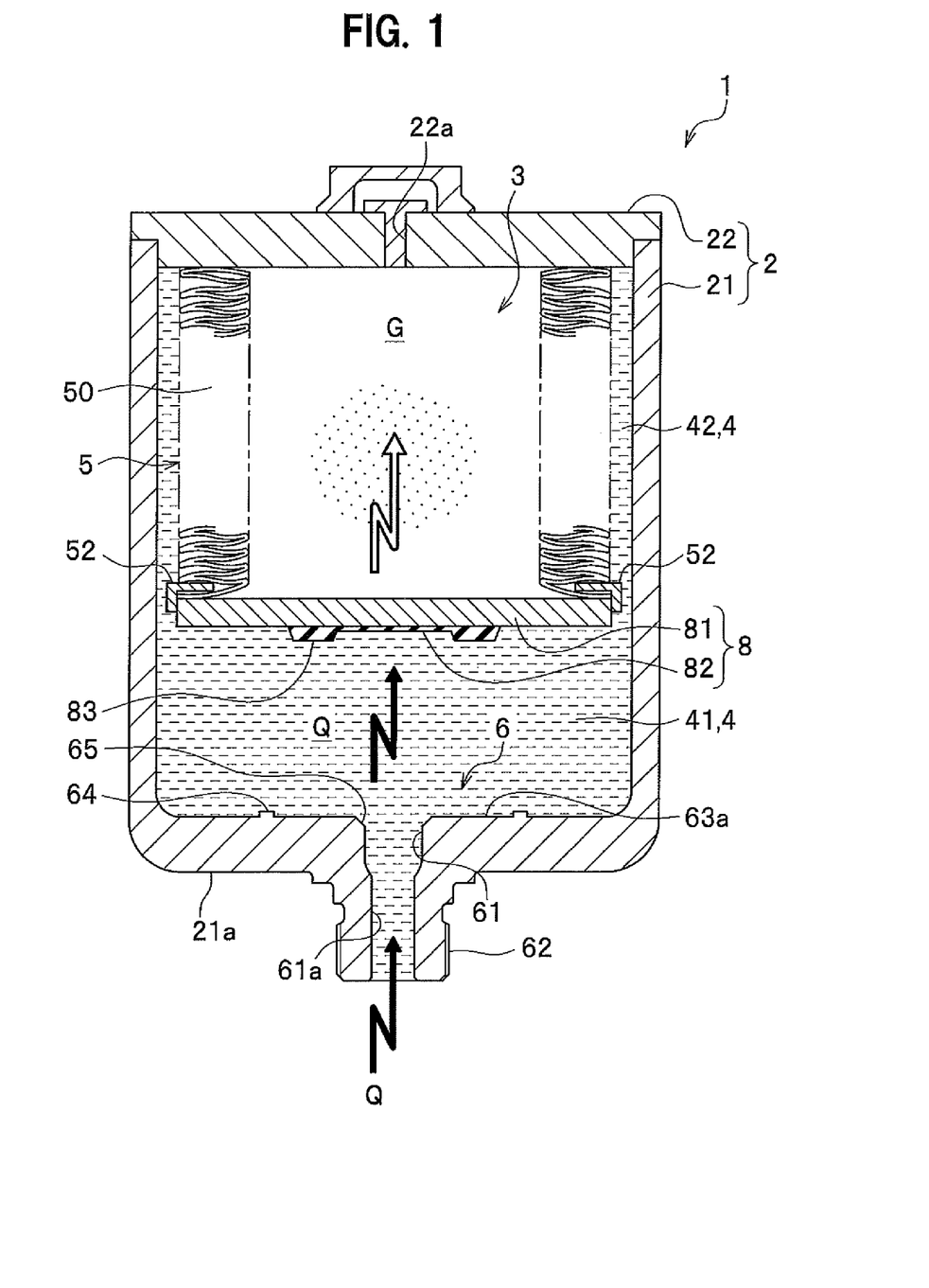
FIG. 1 is a cross-sectional view showing an accumulator according to an embodiment of the present invention.

As shown in FIG. 1, the accumulator 1 is provided with a shell 2 comprised of a pressure vessel, an air chamber 3 which is formed inside the shell 2 and in which high-pressure gas G is filled, a fluid chamber 4 into which pressure fluid Q is introduced from a fluid-pressure circuit (not shown) such as a braking circuit, a bellows 5 which is housed to freely expand and contract in the shell 2, a bellows guide 52 which slidably supports the bellows 5, a port part 6 of the shell 2 in which a pressure fluid inflow port 61 that is open to the fluid chamber 4 is formed, and a self-sealing member 8 which is arranged on a tip portion of the bellows 5.

The self-sealing member 8 is arranged on the tip portion of an elastic part 50 of the bellows 5 to face the port part 6 and has a function of sealing the tip portion of the bellows 5 to serve as a partition forming a border between the air chamber 3 and the fluid chamber 4. The self-sealing member 8 is provided with a base material part 81 which is a metallic member or the like with an enhanced rigidity, a resilient member 82 which is arranged on a surface of the base material part 81 and has an improved sealing performance, and an overhanging portion 83 which is formed on the resilient member 82 and allowed to abut onto a seal area SA (see FIG. 3) of the port part 6 to block the pressure fluid inflow port 61.

Note that although in the present embodiment, the self-sealing member 8 is directly arranged on the tip portion of the elastic part 50 of the bellows 5, a so-called bellows cap (not shown) may be provided to seal the tip portion of the bellows 5 to arrange the self-sealing member 8 thereon.

In the description below, a motion in a desired range of motion of the accumulator 1 is referred to as "a motion in normal operation" (FIG. 1 to FIG. 5), and a motion in a case where the temperature in the air chamber 3 rises excessively due to a fire or the like to cause the pressure in the air chamber 3 to increase more excessively than a predetermined pressure (a pressure in a preliminarily assumed range of motion) in the normal operation is referred to as "a motion in non-normal operation" (FIG. 6 to FIGS. 9A and 9B), for convenience of explanation, in order to discriminate it from the motion in normal operation.

<Motion in Normal Operation>

The accumulator 1 is adapted to allow the bellows 5 to expand and contract, thereby balancing the pressure in the air chamber 3 with the pressure in the fluid chamber 4 to suppress pulsation in a fluid-pressure circuit (not shown) such as a braking circuit to regulate its fluid pressure to an appropriate value.

Figure 2A:
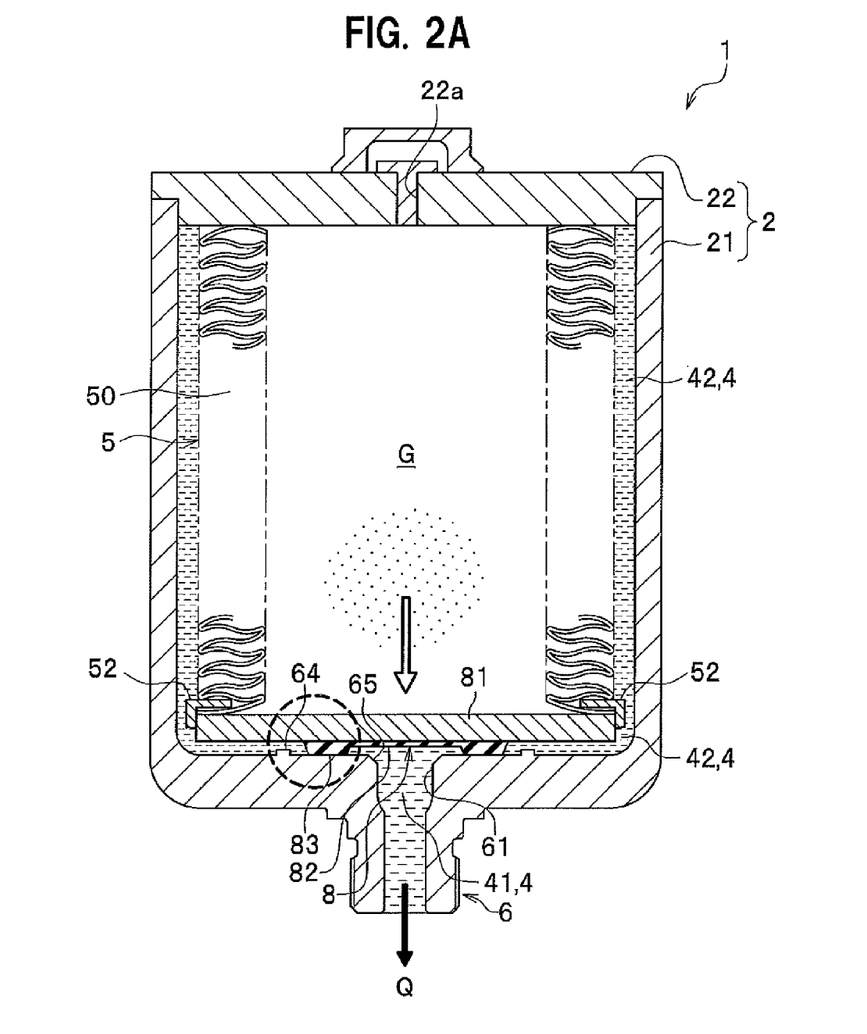
Figure 2B:
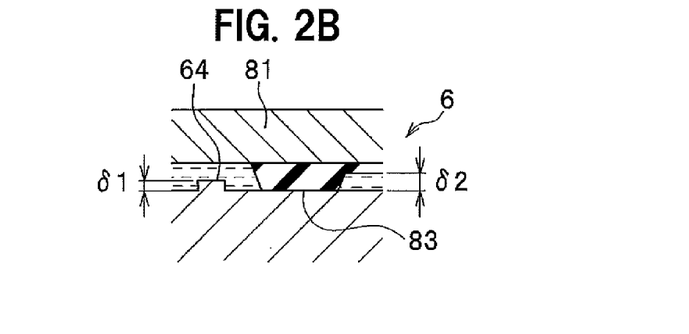
FIG. 2B is a partial enlarged view of a part surrounded by a thick broken line.

Moreover, as shown in FIGS. 2A and 2B, when the fluid pressure of the fluid-pressure circuit (not shown) is decreased to cause the pressure in the fluid chamber 4 to be lower than a predetermined pressure relative to the pressure in the air chamber 3, the self-sealing member 8 is allowed to abut onto the seal area SA (see FIG. 3) of the port part 6 to block the pressure fluid inflow port 61, to thereby prevent a further decrease in the fluid pressure of the fluid-pressure circuit (not shown).

<Shell>

As shown in FIG. 1, the shell 2 is comprised of a pressure vessel of a sealed structure and is provided with a body portion 21 of a cylindrical configuration having a bottom portion 21a, a lid plate 22 welded to an open end of the body portion 21, and a gas filling port 22a arranged on the lid plate 22.

Note that, with respect to some of the members in the present embodiment, although a term that means an up and down relation, such as "the bottom portion 21a" and "the lid plate 22", is used, the term means a positional relation in the figure for convenience of explanation but does not intend to specify a positional relation in the form of use.

<Air Chamber>

The air chamber 3 is formed on the side of the lid plate 22 (on the side of the end opposite to the port part 6) in an axial direction of the shell 2, so as to allow the high-pressure gas G to be filled through the gas filling port 22a therein. The air chamber 3 is formed on the inner peripheral wall side of the bellows 5 (inside the peripheral wall of the bellows 5 serving as a boundary) and is a space surrounded by the inner peripheral wall of the bellows 5, the lid plate 22 and the self-sealing member 8.

<Fluid Chamber>

The fluid chamber 4 is comprised of a first fluid chamber 41 which is formed on the side of the pressure fluid inflow port 61 provided on the port part 6, and a second fluid chamber 42 which communicates with the first fluid chamber 41 and is formed on the outer peripheral wall side of the bellows 5 (outside the peripheral wall of the bellows 5 serving as the boundary).

The first fluid chamber 41 is a region sandwiched primarily between the self-sealing member 8 and the bottom portion 21a of the shell 2.

The second fluid chamber 42 is a region sandwiched primarily between the outer peripheral wall of the bellows 5 and the body portion 21 of the shell 2.

The pressure fluid Q (hydraulic oil) is introduced into the first fluid chamber 41 from a fluid-pressure circuit (not shown) such as a braking circuit through the pressure fluid inflow port 61 formed in the port part 6, and the pressure fluid Q is filled in the second fluid chamber 42 through gaps formed on both sides of the bellows guide 52.

Accordingly, in the normal operation, in a state in which the self-sealing member 8 is not allowed to abut onto the seal area SA (see FIG. 3) of the port part 6 so as not to block the pressure fluid inflow port 61, the first fluid chamber 41 and the second fluid chamber 42 are communicated with each other to equalize respective pressures therein.

On the other hand, in a state in which the self-sealing member 8 is allowed to abut onto the seal area SA (see FIG. 3) of the port part 6 to block the pressure fluid inflow port 61, as shown in FIG. 2A, the self-sealing member 8 breaks communication between the first fluid chamber 41 and the second fluid chamber 42. As a result, although the first fluid chamber 41 is communicated with the fluid-pressure circuit (not shown), the second fluid chamber 42 forms an independent sealed chamber.

Accordingly, in the normal operation, even when the fluid pressure of the fluid-pressure circuit (not shown) is decreased to cause the pressure in the first fluid chamber 41 to be lower than the pressure in the air chamber 3, the pressure in the second fluid chamber 42 is maintained to balance the pressure in the air chamber 3 with the pressure in the second fluid chamber 42 to prevent the bellows 5 from being damaged.

<Bellows>

The bellows 5 is provided with the elastic part 50 which is hollow and which has an accordion annular shape, and the self-sealing member 8 is fixed to the tip portion of the elastic part 50. The elastic part 50 is a member made of metal which resists internal pressure by the high-pressure gas G, and one end thereof is attached firmly to the lid plate 22 to be airtightly fixed to it and the other end thereof is attached firmly to the self-sealing member 8 to be airtightly fixed to it.

The bellows 5 is a partition member forming a boundary between the air chamber 3 and the fluid chamber 4, which is operated to expand in the axial direction by the pressure of gas filled in the air chamber 3 on the inner peripheral wall side of the bellows 5 and is operated to contract by the pressure of fluid introduced into the fluid chamber 4 on the outer peripheral wall side of the bellows 5 from a fluid-pressure circuit (not shown). That is, the bellows 5 is operated to expand and contract to balance the gas pressure and the fluid pressure with each other to thereby suppress pulsation in the fluid-pressure circuit (not shown) to regulate its fluid pressure to a predetermined value.

The bellows guide 52 is a slide member which has the form of an L-shape in cross-section and has a reduced frictional resistance, and is attached on the outer peripheral portion of the self-sealing member 8 to which the elastic part 50 is fixed. The bellows guide 52 is arranged appropriately in two to four locations at equal spaces in the circumferential direction so that the bellows 5 can smoothly expand and contract and the first fluid chamber 41 and the second fluid chamber 42 can be communicated with each other.

Figure 4:
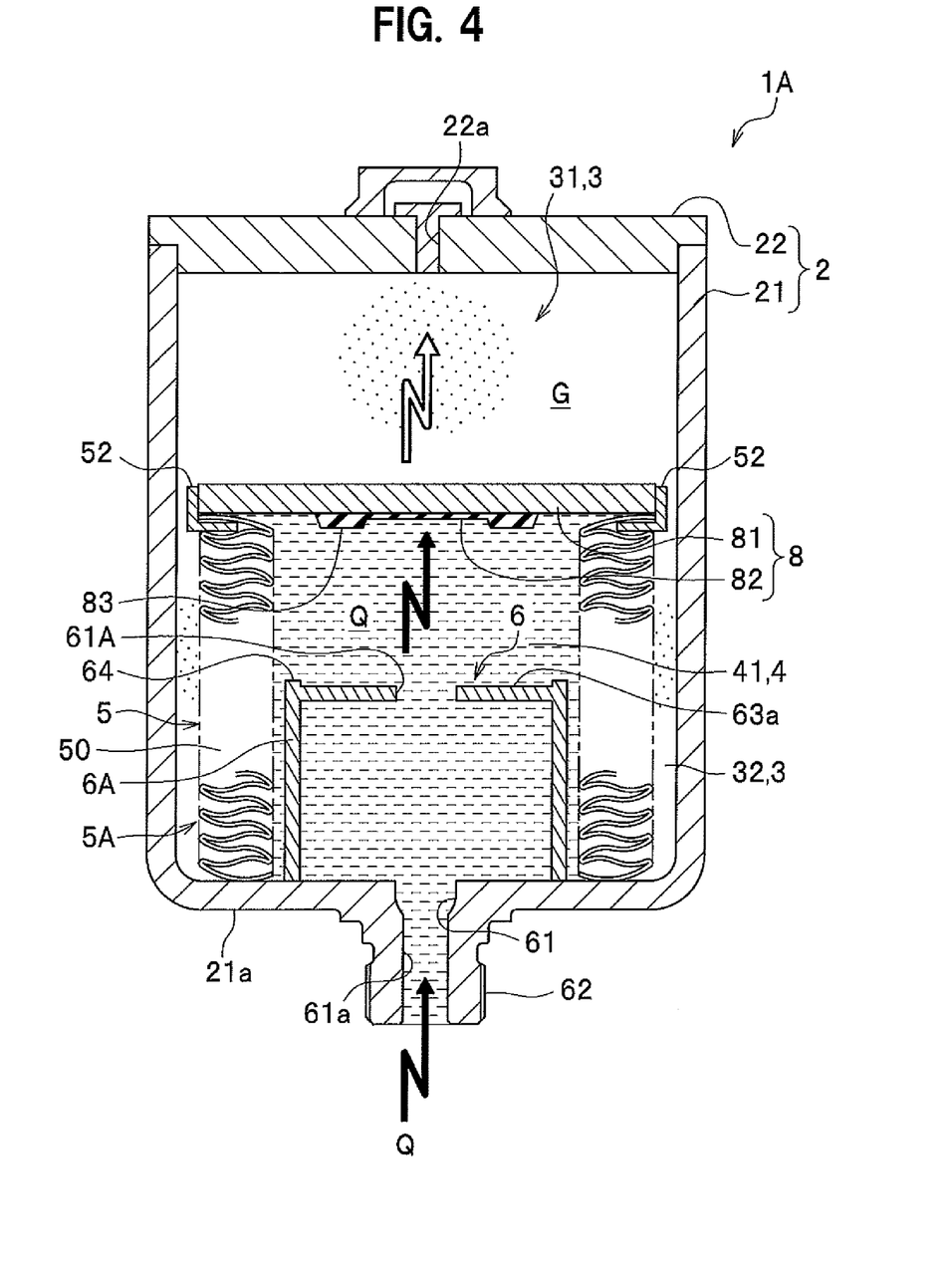
FIG. 4 is a cross-sectional view showing a modified example of the accumulator according to the embodiment of the present invention, which shows an example in which a bellows is arranged on the side of a port part.
Figure 5:
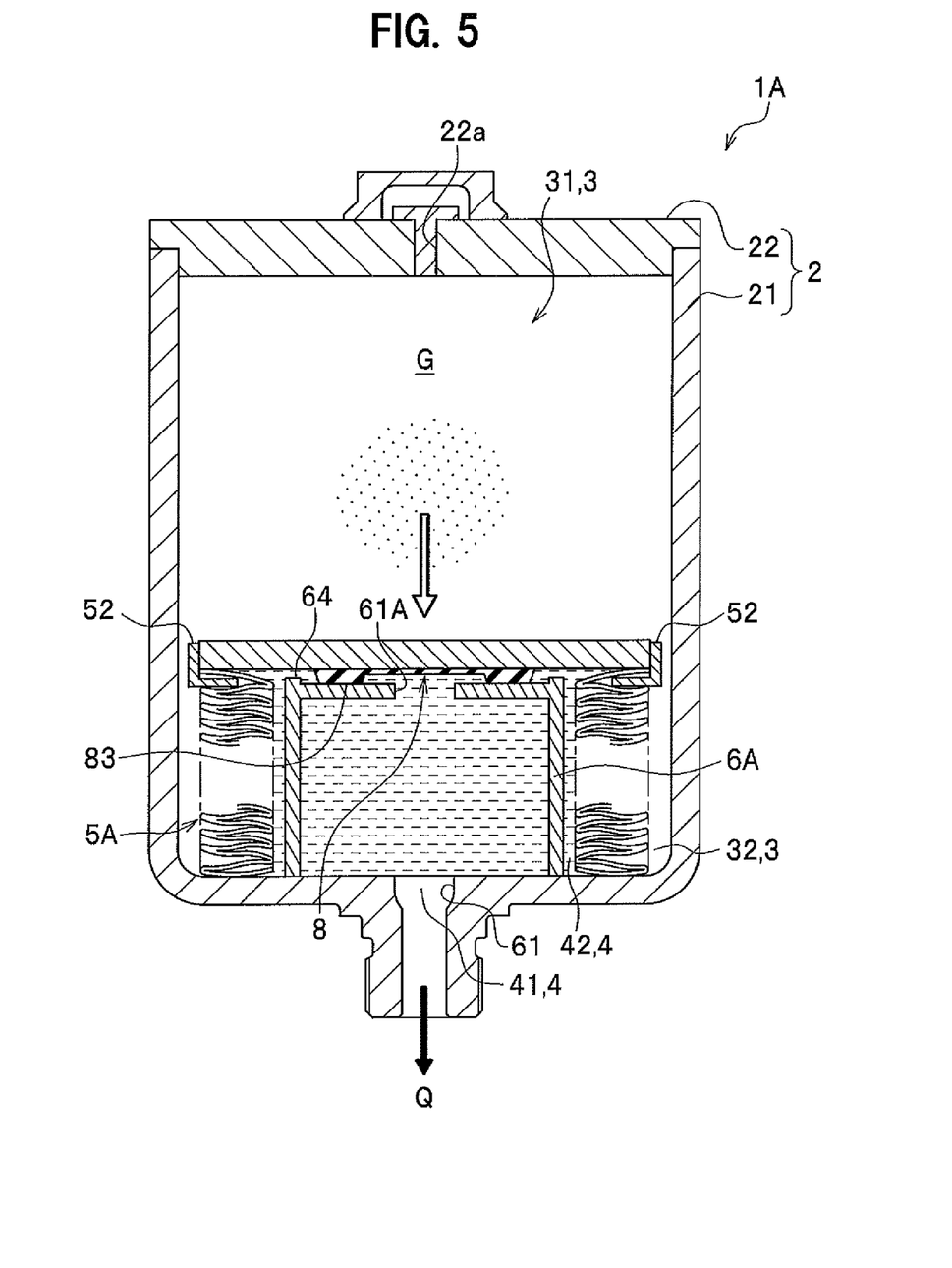
FIG. 5 is a cross-sectional view for explaining a motion in a state in which a pressure fluid inflow port is blocked, in the accumulator according to a modified example of the embodiment of the present invention.

Note that although the accumulator 1 according to the present embodiment has the configuration in which one end of the bellows 5 is fixed to the lid plate 22 to arrange the bellows 5 on the side of the lid plate 22, the present invention is not limited to the configuration. As shown in FIGS. 4 and 5, a bellows 5A may be arranged on the side of a bottom portion 21a. FIGS. 4 and 5 are cross-sectional views showing an accumulator 1A according to a modified example of the present embodiment, in which FIG. 4 is a cross-sectional view showing a state in which the pressure fluid inflow port 61 is not blocked, and FIG. 5 is a cross-sectional view showing a state in which the pressure fluid inflow port 61 is blocked.

The accumulator 1A according to the modified example of the present embodiment differs from the accumulator 1 of the present embodiment, mainly due to a difference in arrangement of the bellows 5A, in that it includes a stay 6A arranged in the port part 6, a second pressure fluid inflow port 61A formed in the stay 6A, and a seal face 63a and a projecting portion 64 arranged on the upper end face of the stay 6A. Since the basic configuration and motions of the accumulator 1A are the same as those of the accumulator 1, a similar component is given the same reference sign and thus detailed description thereof will be omitted, and only main differences will be additionally described.

In the accumulator 1A, the fluid chamber 41,4 is formed on the inner peripheral wall side of the bellows 5A and the air chamber 3 (first air chamber 31 and second air chamber 32) is formed on the outer peripheral wall side of the bellows 5A. As shown in FIGS. 4 and 5, the first air chamber 31 and the second air chamber 32 in the accumulator 1A are communicated with each other in any of the states of FIG. 4 and FIG. 5 and thus respective pressures therein are equalized.

On the other hand, as shown in FIG. 5, in the state in which the pressure fluid inflow port 61 is blocked, the second fluid chamber 42 is formed on the inner side of the bellows 5A, and the first fluid chamber 41 is formed on the inner side of the overhanging portion 83 of the self-sealing member 8 serving as a boundary.

The first fluid chamber 41 and the second fluid chamber 42 produce a similar operation and effect to those in the accumulator 1 described above and thus duplicate description thereof will be omitted. Likewise, since the second fluid chamber 42 forms a sealed chamber, the pressure therein becomes higher than the pressure in the first fluid chamber 41.

Note that, as for a so-called external gas loaded accumulator such as shown in FIG. 5, the present invention can be applied to the same by providing in the shell 2 the stay 6A which is allowed to abut onto and supports the self-sealing member 8 so that the bellows 5A is not excessively contracted when the fluid pressure is decreased.

<Port Part>

The port part 6 is a member including an area surrounding the pressure fluid inflow port 61 which is configured integral with the bottom portion 21a of the shell 2. The port part 6 is provided with a body portion 62 which is connected to a fluid-pressure circuit (not shown) by pipe fitting and/or joints (not shown), and a pressure fluid flow passage 61a which is formed to pass through the body portion 62 and the bottom portion 21a of the shell 2 and communicates with the pressure fluid inflow port 61.

Note that although the port part 6 constituting a port member of the shell 2 is configured integral with the shell 2 from a standpoint of rigidity and/or airtightness, but not limited to this configuration, a configuration to place priority on workability may be adopted in which a port member (not shown) as a separate unit for the shell 2 is fixed to the shell 2. When configured as a separate unit, the port member is fixed to the shell 2 with airtightness secured, using a fixing means such as welding.

Figure 3:
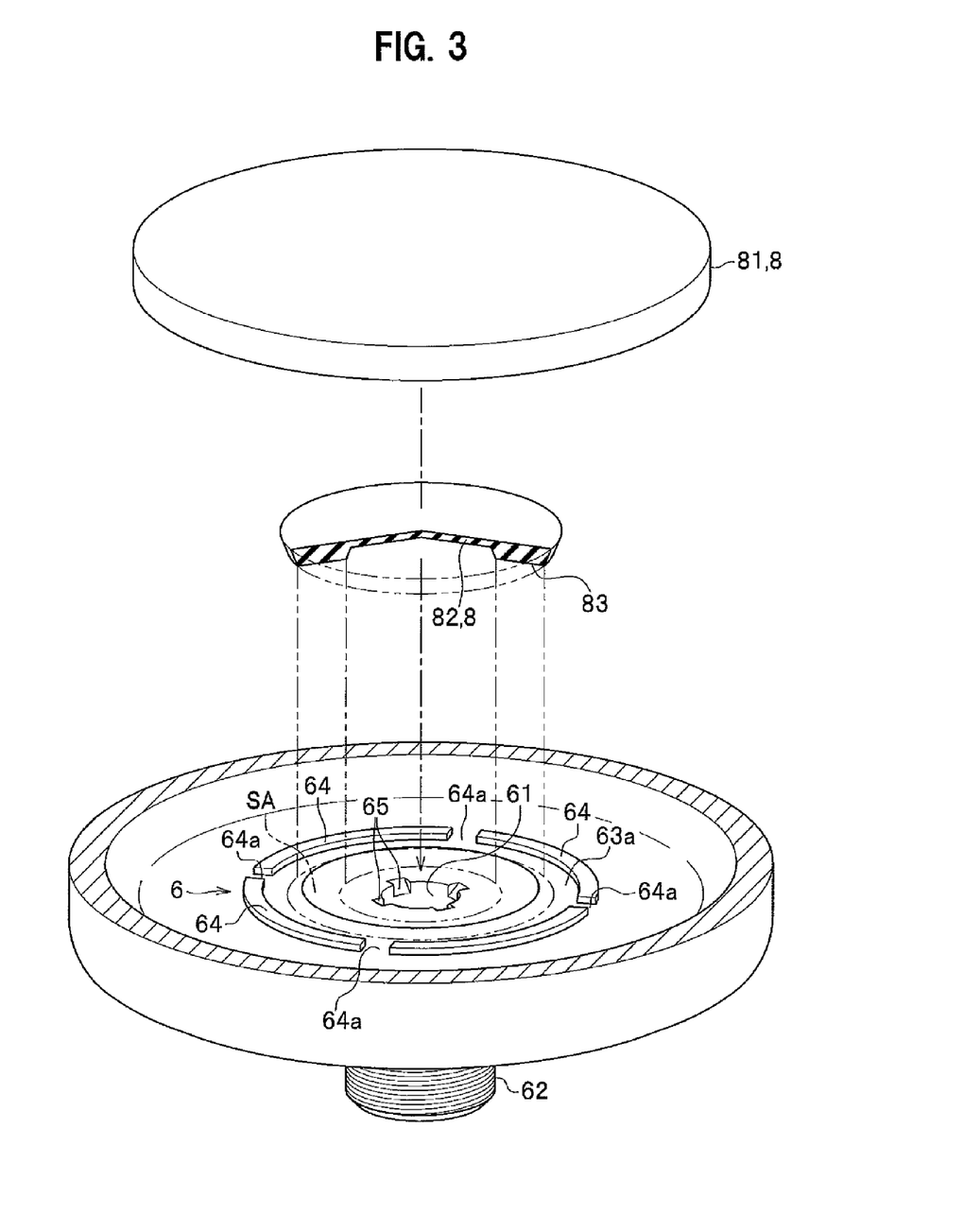
FIG. 3 is an exploded perspective view, partially cut away, showing a self-sealing member and a port part according to the embodiment of the present invention.

As shown in FIG. 3, the port part 6 is provided with the pressure fluid inflow port 61 which is formed open to the inner side of the bottom portion 21a (see FIG. 1) of the shell 2, a seal face 63a (inner face of the bottom portion 21a of the shell 2) onto which the self-sealing member 8 (resilient member 82) is allowed to abut and on which the seal area SA is formed, a projecting portion 64 which is arranged on a region other than the seal area SA on the seal face 63a, and a discharge channel 65 which is formed at an opening edge portion of the pressure fluid inflow port 61.

Formed on the seal face 63a is the seal area SA onto which the overhanging portion 83 of the self-sealing member 8 (resilient member 82) is allowed to abut (see FIG. 3), and the overhanging portion 83 and the seal area SA on the seal face 63a are attached firmly to each other, thereby making it possible to block the pressure fluid inflow port 61 to prevent a further decrease in the fluid pressure of the fluid-pressure circuit (not shown).

As shown in FIG. 3, the projecting portion 64 is arranged on the outer side of the seal area SA in the radial direction relative to the pressure fluid inflow port 61, specifically on the outer border of the seal face 63a. As shown in FIG. 2B, a height δ1 of the projecting portion 64 is set to be lower than a height δ2 of the overhanging portion 83 of the self-sealing member 8 (resilient member 82).

According to this configuration, since the projecting portion 64 is arranged on the region other than the seal area SA to prevent the projecting portion 64 and the resilient member 82 of the self-sealing member 8 from interfering with each other in the state in which the overhanging portion 83 of the self-sealing member 8 (resilient member 82) abuts onto the seal face 63a, the resilient member 82 can be prevented from being damaged and/or separated from the base material part 81 to secure a stable sealing performance and improve durability thereof.

Since the accumulator 1 has the projecting portion 64 thus arranged, when the resilient member 82 melts and/or carbonizes to cause the overhanging portion 83 to lose its sealing performance in a non-normal operation to be described later, the projecting portion 64 is allowed to abut onto the base material part 81 of the self-sealing member 8.

Moreover, as shown in FIG. 3, the projecting portion 64 is arranged in a discontinuous circular pattern with a spaced portion 64a provided in a circumferential direction around the pressure fluid inflow port 61.

The spaced portion 64a is a discontinuous portion of the projecting portion 64 in the circumferential direction. Since the accumulator 1 has the spaced portion 64a thus provided, the pressure fluid Q is allowed to be introduced through the spaced portion 64a and to be discharged through the pressure fluid inflow port 61, in the non-normal operation to be described later.

Note that the location, number, shape and the like of the spaced portion 64a are not specifically limited to the illustrated example, and it is sufficient for the spaced portion 64a to have a configuration capable of introducing the pressure fluid Q.

The discharge channel 65 is formed at an opening edge portion of the pressure fluid inflow port 61 on the seal face 63a to extend outwardly in the radial direction. The discharge channel 65 is formed to facilitate discharging of the pressure fluid Q in the first fluid chamber 41 in the non-normal operation.

<Self-Sealing Member>

The self-sealing member 8 is a member which allows the overhanging portion 83 formed on the resilient member 82 to abut onto the seal area SA of the port part 6 to block the pressure fluid inflow port 61.

The base material part 81 is a metallic member with secured rigidity, while the resilient member 82 uses a sealing material such as rubber so as to improve airtightness in the normal operation. Accordingly, in a state of excessively high temperature and pressure in the non-normal operation, the resilient member 82 melts and/or carbonizes to cause the overhanging portion 83 to transubstantiate to lose its sealing performance, thereby allowing the projecting portion 64 of the port part 6 to abut mainly onto the base material part 81.

<Motion in Non-Normal Operation>

A motion in non-normal operation of the accumulator 1 (also inclusive of the accumulator 1A) according to the embodiment of the present invention, configured as described above, will be described with reference to FIGS. 6 to 9B.

[Blocking of Pressure Fluid Inflow Port]

Figure 6:
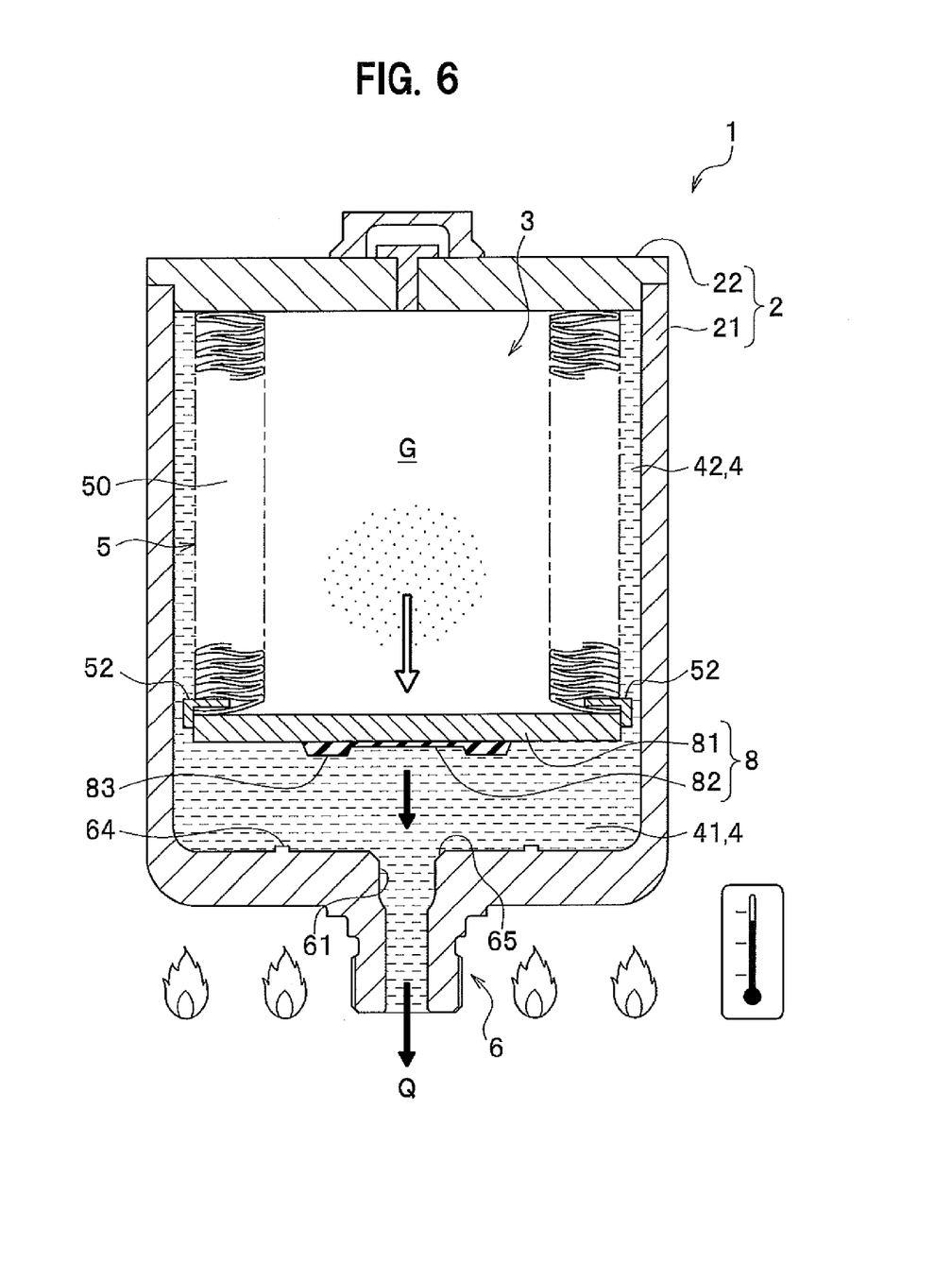
FIG. 6 is a cross-sectional view showing a motion in non-normal operation of the accumulator according to the embodiment of the present invention, which shows a state at an early stage when the accumulator encounters a fire or the like to cause a pressure and a temperature in an air chamber to increase.
Figure 7A:
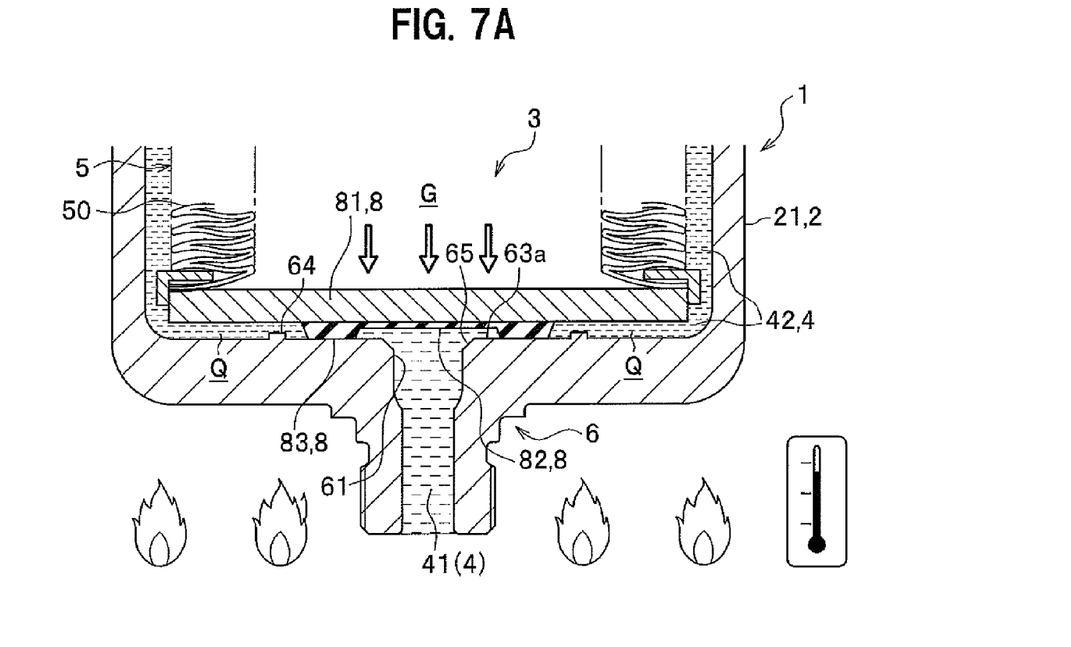

In the non-normal operation, at an early stage as shown in FIG. 6 when the accumulator 1 encounters a fire or the like to cause a pressure and a temperature in the air chamber 3 to increase, the bellows 5 expands downwardly in FIG. 6, to allow the overhanging portion 83 of the self-sealing member 8 to attach firmly to the seal face 63a (seal area SA) of the port part 6 to block the pressure fluid inflow port 61 (see FIG. 7A).

[Loss of Sealing Performance of Resilient Member]

Figure 7B:
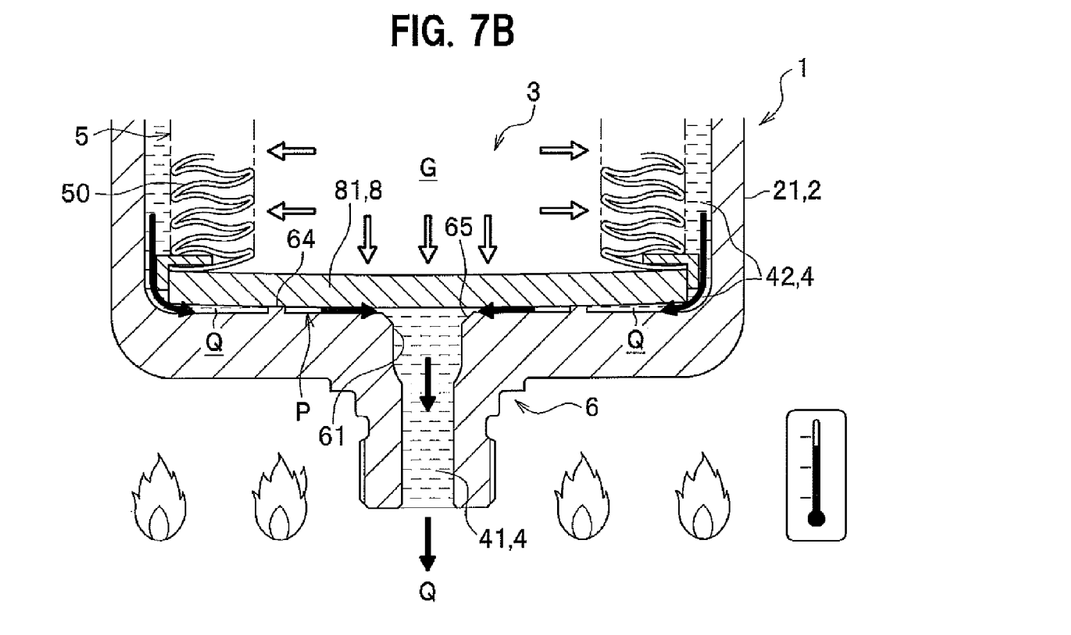
FIG. 7B shows a state in which a resilient member melts to cause a sealing performance to be lost.

When the bellows 5 further expands to cause the pressure and the temperature in the air chamber 3 to increase excessively, as shown in FIG. 7B, the resilient member 82 in the self-sealing member 8 first melts and/or carbonizes to transubstantiate to thereby cause the overhanging portion 83 to lose its sealing performance.

[Formation of Gap Portion]

Figure 8A:
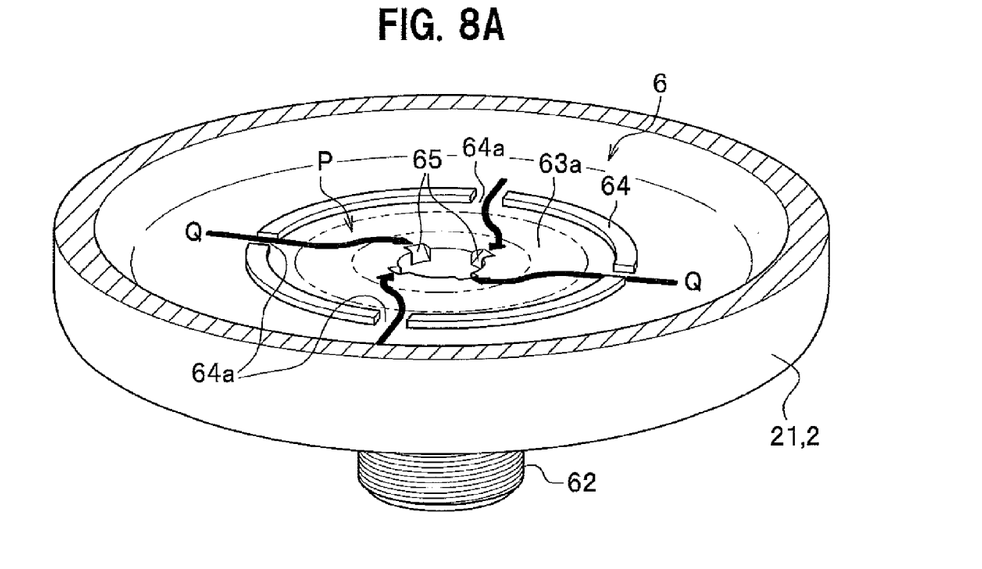

Thus, when the resilient member 82 transubstantiates to cause the overhanging portion 83 to lose its sealing performance, the projecting portion 64 is allowed to abut onto the base material part 81 of the self-sealing member 8, and as a result, a gap portion P equal to the height of the projecting portion 64 is formed between the seal face 63a and the self-sealing member 8 (see FIGS. 7B and 8A).

[Formation of Gap Portion]

As shown in FIGS. 7B, 8A, 8B, 9A and 9B, the gap portion P is a gap constituting a flow passage which leads from the outer border of the seal face 63a to the pressure fluid inflow port 61, and the flow passage is used for discharging the high-pressure gas G and the pressure fluid Q which are introduced inside through the spaced portion 64a provided between the projecting portions 64 on the seal face 63a, and are led via the gap between the seal face 63a and the self-sealing member 8 (base material part 81) to the discharge channel 65 arranged at the opening edge portion of the pressure fluid inflow port 61.

As shown in FIG. 7B, for example, when the self-sealing member 8 is bent by the pressure in the air chamber 3, the height of the gap portion P at the opening edge portion of the pressure fluid inflow port 61 is reduced to make it hard for the pressure fluid Q in the first fluid chamber 41 to flow. To cope with this, the discharge channel 65 is arranged to make higher the height of the gap portion P at the opening edge portion of the pressure fluid inflow port 61 and to secure a sufficient flow passage to facilitate discharging of the pressure fluid Q in the first fluid chamber 41.

Moreover, the discharge channel 65 has a function of reliably preventing the pressure fluid inflow port 61 from being blocked due to abutting of the base material part 81 onto the opening edge portion of the pressure fluid inflow port 61.

Note that for convenience of explanation, in FIG. 7B of the present embodiment, in order to exaggeratingly express flexure of the self-sealing member 8 to secure a greater height of the gap portion P, the discharge channel 65 is provided at the opening edge portion of the pressure fluid inflow port 61. However, the location, number, shape and the like of the discharge channel 65 are not specifically limited to the illustrated example. When the height of the gap portion P is sufficiently secured by the projecting portion 64, the discharge channel 65 does not have to be provided.

Note that for convenience of explanation, in FIG. 7B, the state in which the resilient member 82 melts and/or carbonizes to lose its sealing performance is exaggeratingly shown and thus the resilient member 82 is not shown. However, even if the resilient member 82 remains, the shapes and sizes of the projecting portion 64 and the spaced portion 64a are appropriately set so that the gap portion P can lead from the outer border of the seal face 63a to the pressure fluid inflow port 61.

[Discharge of Pressure Fluid in Fluid Chamber]

Figure 8B:
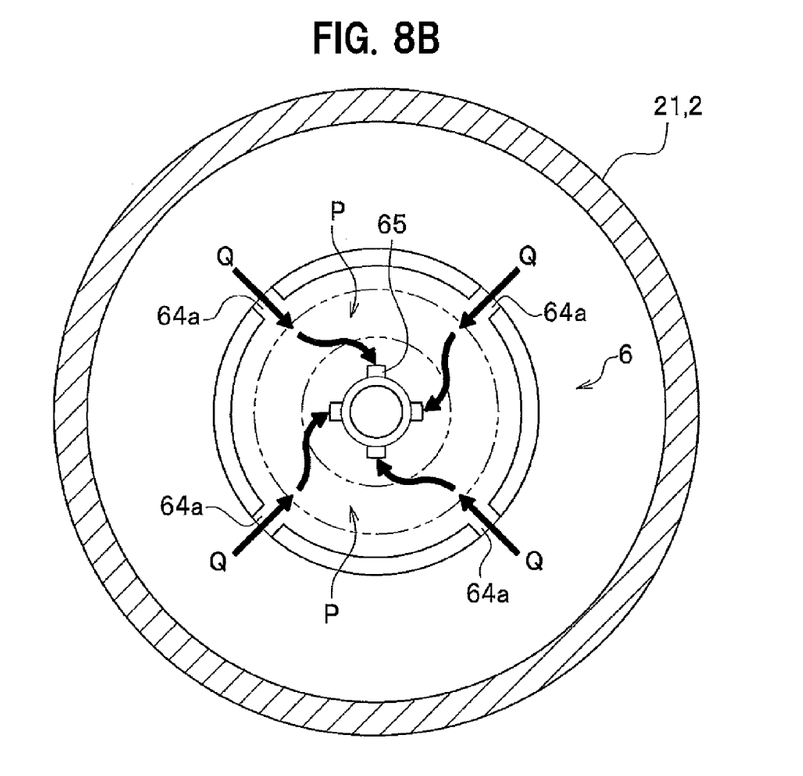
FIG. 8B is a plan view of the port part.

Since the accumulator 1 is adapted to form the gap portion P which leads from the outer border of the seal face 63a to the pressure fluid inflow port 61 in the non-normal operation, as shown in FIG. 7B, the pressure fluid Q in the second fluid chamber 42 can be discharged through the gap portion P quickly and reliably (see FIGS. 8A and 8B).

[Damage of Bellows]

Figure 9A:
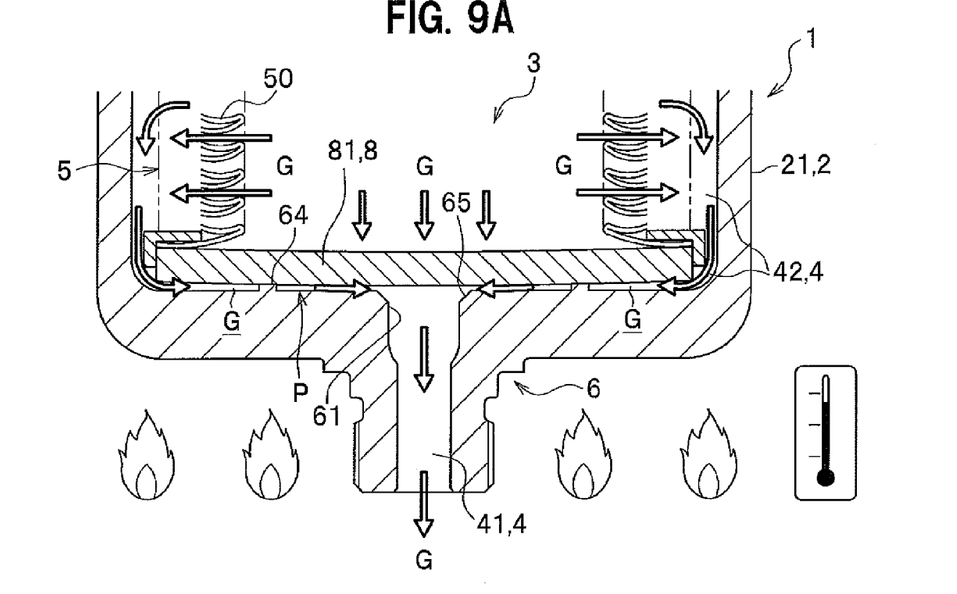
Figure 9B:
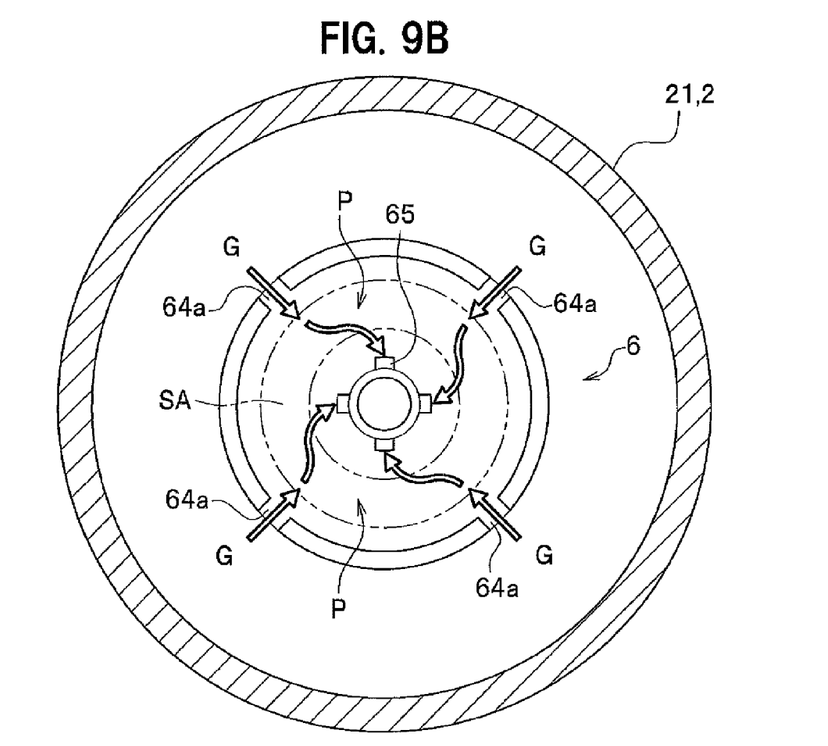
FIG. 9B is a plan view of the port part.

Then, the pressure fluid Q in the second fluid chamber 42 is discharged to cause the pressure in the second fluid chamber 42 to decrease, thereby increasing the pressure of the high-pressure gas G in the air chamber 3 which acts on the inner peripheral wall of the bellows 5, more excessively than the fluid pressure of the pressure fluid Q which acts on the outer peripheral wall of the bellows 5. Consequently, as shown in FIG. 9A, the high-pressure gas G acts on the bellows 5 which has partitioned the inside of the shell 2 into the second fluid chamber 42 and the air chamber 3, thereby making it possible to damage the bellows 5 purposefully to allow the high-pressure gas G to release from the air chamber 3 into the second fluid chamber 42.

[Discharge of High-Pressure Gas in Air Chamber]

In this manner, the accumulator 1 allows the bellows 5 to be damaged quickly and reliably to release the high-pressure gas G in the air chamber 3 into the second fluid chamber 42.

The high-pressure gas G released into the second fluid chamber 42 passes through the gap portion G leading from the outer border of the port part 6 to the pressure fluid inflow port 61, to be discharged quickly through the pressure fluid inflow port 61, thereby decreasing the pressure of the high-pressure gas G in the air chamber 3.

Thus, the accumulator 1 makes it possible to reduce a machining man-hour with the simple configuration that the projecting portion 64 is provided on the port part 6; to reliably prevent damage of the resilient member 82 and improve durability thereof to realize a stable and reliable operation of the accumulator 1 in the normal operation; and to release the high-pressure gas G in the air chamber 3 quickly and reliably with the projecting portion 64 abutting onto the base material part 81 of the self-sealing member 8 in the non-normal operation in which the internal pressure and/or the temperature increases more excessively than in the normal operation.

Note that for convenience of explanation, although the present embodiment has given the description such that, with the motions of the accumulator 1 separated simply, the pressure fluid Q in the fluid chamber 4 is discharged and the high-pressure gas G in the air chamber 3 then passes through the fluid chamber 4 to be released, the motions of the accumulator 1 actually progress in the manner of coincidental development. For example, when the fluid pressure in the fluid chamber 4 is in a sufficiently decreased state, the high-pressure gas G passes through the pressure fluid Q in the fluid chamber 4 to be released quickly.

Figure 10A:
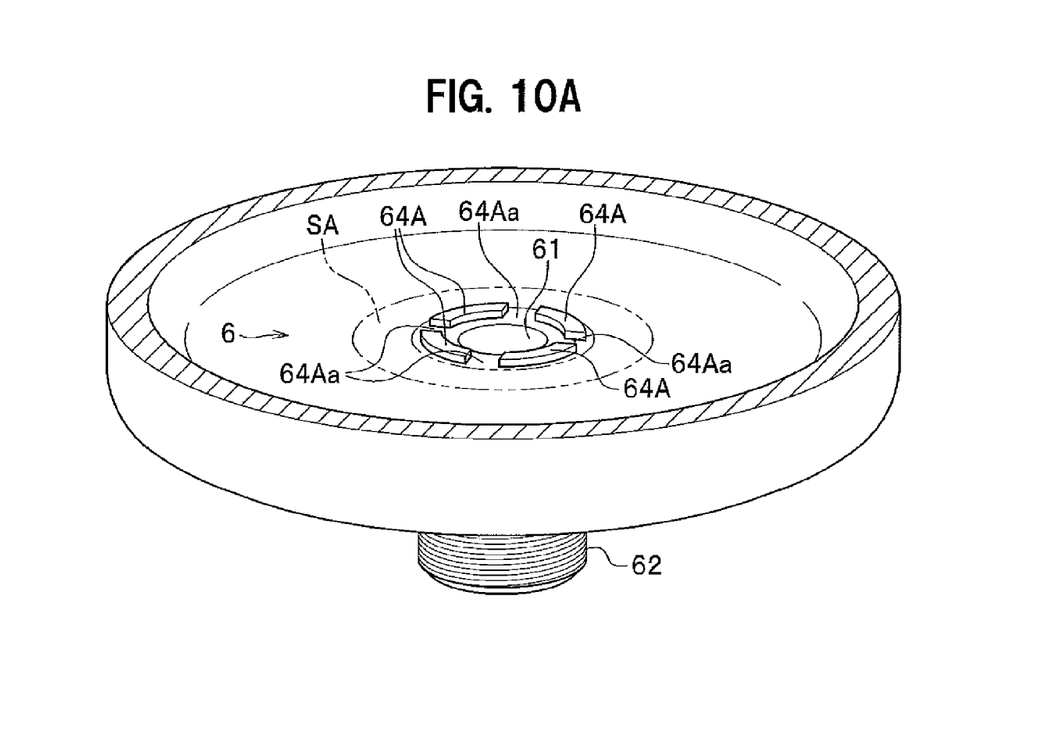
Figure 10B:
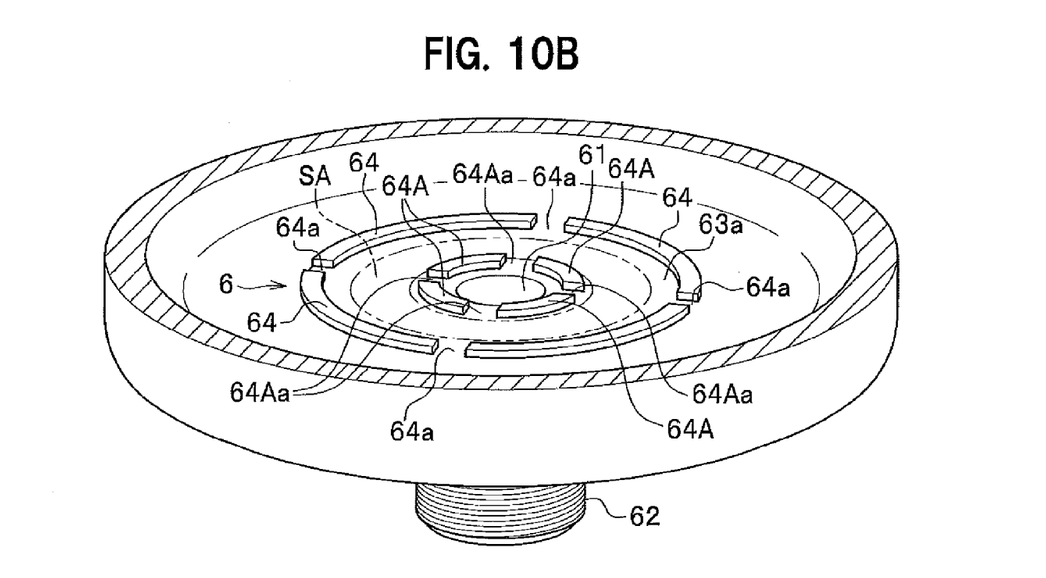
FIG. 10B is a modified example in which projecting portions are provided both inside and outside the seal area.

Although the embodiment of the present invention has been described above, the present invention is not limited to the embodiment described above and can be appropriately modified to be carried out. For example, although in the present embodiment as shown in FIG. 3, the projecting portion 64 is arranged on the outer side of the seal area SA in the radial direction, the present invention is not limited to this arrangement. As shown in FIG. 10A, a projecting portion 64A may be arranged on the inner side of the seal area SA in the radial direction. Alternatively, as shown in FIG. 10B, an arrangement may be adopted which is provided with both of the projecting portion 64 arranged on the outer side of the seal area SA in the radial direction and the projecting portion 64A arranged on the inner side of the seal area SA in the radial direction.

Note that a spaced portion 64Aa shown in FIG. 10A has a similar configuration to the spaced portion 64a shown in FIG. 3 and thus detailed description thereof is omitted.

DESCRIPTION OF REFERENCE SIGNS 1,1A: Accumulator, 2: Shell, 3: Air chamber, 4: Fluid chamber, 5,5A: Bellows, 6: Port part, 8: Self-sealing member, 21: Body portion, 22: Lid plate, 41: First fluid chamber (Fluid chamber), 42: Second fluid chamber (Fluid chamber), 50: Elastic part, 52: Bellows guide, 61: Pressure fluid inflow port, 62: Body portion, 63a: Seal face, 64,64A: Projecting portion, 64a,64Aa: Spaced portion, 65: Discharge channel, 81: Base material part, 82: Resilient member, 83: Overhanging portion, G: High-pressure gas, P: Gap portion, Q: Pressure fluid, SA: Seal area

What is claimed is:

1. An accumulator comprising:
a shell inside which an air chamber and a fluid chamber are formed;
a bellows which is housed to freely expand and contract in the shell and partitions the inside of the shell into the air chamber and the fluid chamber;
a port part which is provided on the shell and in which a pressure fluid inflow port that is open to the fluid chamber is formed; and
a self-sealing member which is arranged on a tip portion of the bellows to face the port part, wherein
when a pressure in the fluid chamber is lower than a predetermined pressure relative to a pressure in the air chamber, the self-sealing member is allowed to abut onto a seal area of the port part to block the pressure fluid inflow port, and wherein
the self-sealing member includes a base material part, a resilient member which is arranged on a surface of the base material part to face the seal area, and an overhanging portion which is formed on the resilient member and allowed to abut onto the seal area for sealing, and
the port part includes a seal face which is allowed to abut onto the overhanging portion and on which the seal area is formed, and a projecting portion which is arranged on a region other than the seal area on the seal face, and wherein
when a temperature in the air chamber rises more excessively than in a normal operation, the overhanging portion on the resilient member transubstantiates to allow the projecting portion to abut onto the base material part and to form between the seal face and the self-sealing member a gap portion which leads from an outer border of the seal face to the pressure fluid inflow port, the gap portion communicating with the fluid chamber through a spaced portion provided in the projecting portion, so as to release the pressure in the air chamber through the gap portion.

2. The accumulator according to claim 1, wherein the seal area is formed circularly around the pressure fluid inflow port, and the projecting portion is arranged on at least one of an outer side and an inner side in a radial direction of the seal area relative to the pressure fluid inflow port.

3. The accumulator according to claim 2, wherein the projecting portion is arranged on the outer side of the seal area in the radial direction relative to the pressure fluid inflow port, and the port part is provided with a discharge channel which is formed at an opening edge portion of the pressure fluid inflow port on the seal face to extend outwardly in a radial direction.

4. The accumulator according to claim 1, wherein the projecting portion is arranged in a discontinuous circular pattern with the spaced portion provided in a circumferential direction around the pressure fluid inflow port.

5. The accumulator according to claim 4, wherein the projecting portion has a larger area than the spaced portion in planar view.

6. The accumulator according to claim 1, wherein the port part is configured as a separate unit for the shell.

7. The accumulator according to claim 1, wherein the port part is arranged on one end face portion of the shell, and a base end portion of the bellows which is on an opposite side of the tip portion thereof is supported on another end face portion of the shell.

* * * * *